Jan. 3, 1933. C. S. ROOT 1,892,736
COMPACT
Filed Feb. 1, 1932
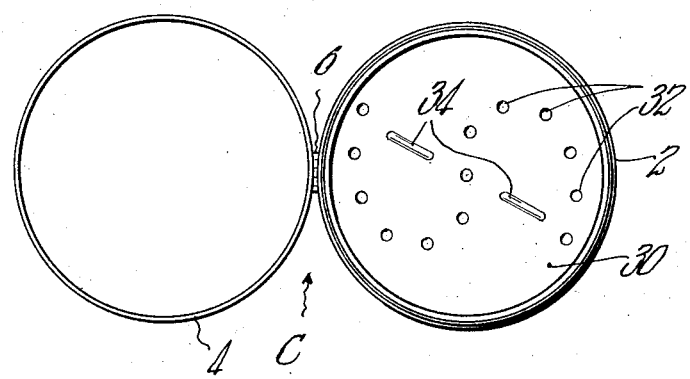
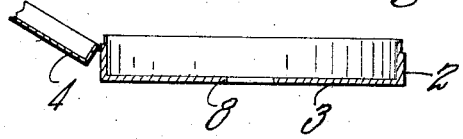
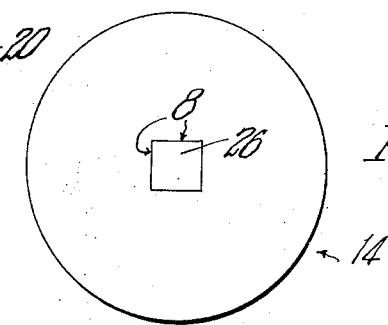
INVENTOR.
Charles S. Root.
BY
ATTORNEY.

Patented Jan. 3, 1933

1,892,736

UNITED STATES PATENT OFFICE

CHARLES S. ROOT, OF SPRINGFIELD, MASSACHUSETTS

COMPACT

Application filed February 1, 1932. Serial No. 590,028.

This invention relates to improvements in compacts and the like, and is directed more particularly to compacts and renewable fillers therefor.

The principal objects of the invention are directed to the provision of the combination of a compact having a renewable filler or cartridge container therefor, whereby an empty cartridge may be replaced with a filled one, and they are constructed to include certain novel features whereby users may dispense powder and other substances therefrom as may be desired.

Various novel features and advantages of the invention will be more fully hereinafter referred to in connection with the accompanying description of the preferred form of the invention.

In the drawing:

Fig. 1 is a plan view of a compact in open position with the cartridge container forming part of the invention associated therewith.

Fig. 2 is a sectional elevational view through the compact shown in Fig. 1.

Fig. 3 is an inverted plan view of the compact shown in Fig. 1, and

Fig. 4 is a transverse sectional view through the cartridge or container which is receivable in the compact.

Referring now to the drawing more in detail the invention will be fully described.

In Figs. 1, 2 and 3 there is shown a compact C which includes a receptacle or case 2 and a cover or closure 4 therefor. The compact may take any desired form but in its preferred form it will be circular and will preferably be made of relatively thin material such as metal, celluloid or the like.

A lower wall 3 of the case 2 has a socket 8 which in the form of the invention is non-round, such as square, and is shown more clearly in Fig. 3. This socket is for receiving a part 26 which may be called a key of a cartridge 14 as will be later described.

The cartridge is indicated generally by 14 and includes a container having a lower wall 22 and side walls 20 and is receivable within the walls of the compact 2.

This cartridge or container may be of relatively thin metal or the like and its lower wall carries the key 26 previously mentioned which is receivable in the sockets of the lower wall 3 of the compact. This is to prevent rotation of the cartridge when in the compact.

A disk 30 is rotatable in the container and it is provided with a plurality of openings 32 therethrough and a grip or grips 34 on the upper side thereof. With the cartridge in the compact one may turn the disk by grasping the grip and as the disk rotates, powder or other material therebelow will be discharged upwardly through the openings onto the upper side thereof from whence the material may be removed therefrom.

The openings 32 are preferably punched so that on the lower side of the disk there are numerous edge portions which will impinge or dig into or scrape the material below the disk. A spring 36 shown in Fig. 4, the convolutions of which are adjacent the walls of the container, bear on the disk and is held within the container by turning the upper marginal edges of the side walls 20 as at 40 inwardly. The spring is preferably so constructed that it will exert more or less pressure on the disk and as the disk is rotated it will urge the disk downwardly.

It is possible to place a considerable amount of material such as powder within the container that is to press it more or less so that it is more or less hard. As the disk is rotated it will loosen the powder so that it will be discharged through the openings thereof, the spring acting to force the disk downwardly as desired.

By means of the invention it is possible to provide renewable cartridges for the compact so that a supply of material such as powder may be supplied the compact without the necessity of filling it. In this way the compact is readily filled and the material in the cartridges used may be dispensed as may be desired.

Various changes may be made in the form of the invention without departing from the spirit and scope thereof and what it is desired to claim and secure by Letters Patent is:

1. As a new article of manufacture, a container having a lower wall and side walls extending upwardly therefrom to provide an open upper side, a disc between said side walls which is rotatable therein and is provided with openings therethrough, a grip on the upper side of said disc, portions of said side walls at the upper ends thereof extending inwardly in the form of a lip and a spring around the inner sides of said side walls between said disc and lip at the upper ends of said walls.

2. A device of the class described comprising in combination, a container having a lower wall and an upper open side, a disc rotatable in said container provided with openings therethrough, a grip on the upper side thereof and a spring associated with said container and disc for urging the same downwardly in said container.

3. The combination of a compact case with a cartridge removably receivable therein comprising, a container for fitting in said compact having an open upper side, a disc rotatable in said container which is provided with openings therethrough and means associated with said container for urging said disc downwardly therein.

4. The combination of a compact case having a socket in a wall thereof with a cartridge removably receivable therein comprising, a container for fitting in said case having a key for fitting in said socket whereby the cartridge is held against rotation in said case, a disc rotatable in said container provided with openings therethrough, a grip on the upper side thereof, and a spring between said disc and the extremity of the side wall of said container urging the disc downwardly in said container.

5. A device of the class described comprising in combination, a compact case member and a cartridge member removably receivable therein, means associated with said case and cartridge to hold them against relative rotation when the cartridge is in the case, the said cartridge including a container having an open upper side, a disc rotatable in said container provided with openings therethrough, a spring adjacent the side walls of said container between said disc and the upper end of the side walls of the container to urge said disc downwardly in said container.

6. A device of the class described comprising in combination, a compact case member and a cartridge removably receivable therein, a wall of said compact being provided with a socket for receiving a key associated with said cartridge, the said cartridge including a container having upwardly extending side walls, the extremity of which is turned inwardly, a disc rotatable in said container provided with openings therethrough and a grip on the upper side thereof, and a compression spring having its convolutions adjacent the side walls of the container and its opposite ends bearing on said disc and the extremity of the side wall.

In testimony whereof I affix my signature.

CHARLES S. ROOT.